United States Patent [19]

McDade

[11] 4,252,158

[45] Feb. 24, 1981

[54] STRAP TENSIONING TOOL

[75] Inventor: Robert L. McDade, Downingtown, Pa.

[73] Assignee: FMC Corporation, Philadelphia, Pa.

[21] Appl. No.: 55,436

[22] Filed: Jul. 6, 1979

[51] Int. Cl.³ .............................................. B21F 9/00
[52] U.S. Cl. .................................. 140/123.6; 140/93.2
[58] Field of Search ................... 242/74, 78.3; 254/51, 254/52; 100/32; 140/93 R, 93.2, 93.4, 123.6

[56] References Cited

U.S. PATENT DOCUMENTS

| 634,191 | 10/1899 | Truyter | 242/74 |
|---|---|---|---|
| 1,825,044 | 9/1931 | Baxenden et al. | 242/74 |
| 1,917,663 | 7/1933 | Porter | 254/51 |
| 2,156,062 | 4/1936 | Porter | 254/51 |
| 2,199,744 | 5/1940 | Gerrard | 140/123.6 |
| 2,600,224 | 6/1952 | Dunbar | 140/93 R |
| 3,048,204 | 8/1962 | Lingle | 140/123.6 |
| 3,129,728 | 4/1964 | Sharko | 254/51 |

Primary Examiner—Lowell A. Larson
Attorney, Agent, or Firm—Eugene G. Horsky; Charles H. Johnson

[57] ABSTRACT

An improved strap tensioning tool, which is particularly adopted for use with non-metallic strap, in which the free end portion of a strap laced about an article which is to be strapped is gripped between an anvil and a wedge-shaped clamp member while the feed portion of such strap is engaged with a tension-applying means. The clamp member is floating supported for effectively gripping the strap during the initial tensioning thereof, regardless of the strap thickness, and a single operating lever serves to actuate the tensioning-applying means, facilitate tensioning of the strap free end portion after such portion is connected to the tensioned feed portion thereof, effect severance of the applied strap from a supply, and release of the clamp member.

17 Claims, 12 Drawing Figures

STRAP TENSIONING TOOL

The present invention is directed to an improved tool for use in applying a tensioned or stretched non-metallic strap about an article and, after the sealing of overlapping portions of such strap, severing the applied tensioned strap from a supply.

With strap tensioning or stretching tools of the type here under consideration, a free end portion of a strap is gripped inwardly from its free end, the strap is looped about an article which is to be strapped, and a feed portion thereof is engaged with a tension-applying mechanism. After tension is applied to the strap, the free end portion and an overlying feed portion of the strap are connected, as by a crimped seal. The strap is then severed from a supply at a location beyond the sealed area thereof and the tool is removed from the strapped article.

With certain of such known strap tensioning tools, positive and/or uniform gripping of the free end portion of a non-metallic strap is either lacking or diminishes with tool wear and/or when straps of other than certain specific thicknesses are employed. As a result, with such known tensioning tools the strap free end portion tends to slide relative to the tool gripping means during the initial and/or subsequent tensioning thereof, and/or prehaps be exposed to such stress concentrations as may damage or destroy the strap utility.

Still other of the known strap tensioning tools are capable of severing a strap only while it is under significant tension and are thus not suitable for use with molecularly oriented plastic strap which tends to split longitudinally or fibrillate when cut in such stressed condition.

With still other of the known strap tensioning tools, tool release from the applied tensioned strap is achieved with difficulty and is often accompanied by abrasion damage to the surface of the applied strap.

Accordingly, a primary object of this invention is to provide an improved and more satisfactory tensioning tool for use with non-metallic strap.

Another object of this invention is to provide a strap tensioning tool which provides for positive and uniform gripping of strap, independent of the strap thickness and the tolerances present between certain of the cooperating elements thereof.

Still another object is the provision of an improved strap tensioning tool which provides for consistently satisfactory operation notwithstanding the presence of significant tolerances between certain cooperating parts thereof introduced during manufacture and/or through wear.

A still further object of this invention is an improved strap tensioning tool which is adapted to effect severance of a non-metallic strap after or concomitantly with the relaxation thereof from a tensioned condition.

A still further object of this invention is to provide a tensioning tool in which means for gripping the free end portion of a non-metallic strap is released only after strap areas adjacent to such ripping means are under substantially like tension.

These and other objects are achieved in accordance with the present invention by an improved strap tensioning tool in which a non-metallic strap is gripped along the free end portion thereof between a clamp member and anvil, laced about an article which is to be strapped, and then engaged along a feed portion thereof with a tension-applying means. The anvil forms part of a rigid body of the tool, while the clamp member is carried by a shaft which is, in turn, mounted on and rotatable relative to the tool body. A spring rotates the clamp shaft so that the clamp member is normally urged toward the anvil.

More specifically, the anvil and clamp member are provided with generally flat strap gripping surfaces. The clamp member is slotted so as to receive yet be capable of sliding relative to the clamp shaft along a plane which defines with the gripping surface thereon an acute angle having its apex remote from the tension-applying means. Thus, as facilitated by such inclined slot, the clamp member is slidable in one direction relative to the clamp shaft to accommodate between its gripping surface and that of the anvil, the thickness of the particular strap which is to be applied to an article. The inclined slot also permits the clamp member to slide relative to the clamp shaft in a direction opposite the one direction mentioned above during strap tensioning to thereby firmly clamp such strap against the anvil by the wedging action provided by the clamp member and clamp shaft.

While known are tensioning tools having clamp members which are intended to grip the leading end portion of a strap against an anvil with a wedging action, the tool of the present invention facilitates a positive and firm gripping of the leading end portion of a strap, especially during the initial tensioning of the same, and thus overcomes a prevalent deficiency of such known tools. The achievement of these results is facilitated by resilient means which urge the clamp member relative to the clamp shaft in a direction away from the strap tensioning-applying means. It appears that with this arrangement the trailing or heel portion of the clamp member gripping surface is so disposed as to bite into the strap surface during the initial tensioning of the strap and causes, perhaps progressively, the entire of such gripping surface to firmly clamp the strap against the anvil. Thus, slipping of the leading end portion of the strap from between the clamp member and anvil during initial strap tensioning, as is encountered with known tensioning tools, is certainly negligible, if not absent, when using the tool of the present invention.

Aside from encouraging the clamp member to bite into a strap surface during initial tensioning of such strap, the described arrangement for resiliently urging the clamp member provides also for a generally uniform gripping of the leading end portion of the strap, by generally all portions of the opposed anvil and clamp member gripping surfaces which are engaged therewith, during subsequent tensioning. Evidence of such uniform gripping of the strap leading end portion is apparent from the pattern embossed into the surfaces of a plastic strap by the anvil and clamp member gripping surfaces during use of the tool of this invention. Significantly, the described arrangement for resiliently biasing the clamp member does not inhibit the ability of such clamp member to accommodate itself to straps of different thickness or in any way lessen the tenacious gripping of the strap during the entire tensioning operation. Apparently the simplicity of this arrangement is that which has shielded the same from discovery heretofore.

Inclination of the clamp member slot relative to the generally flat gripping surface thereon is essential and is such as to define an acute angle which is critical only within generally wide limits. Preferably, such acute angle is about 15° for consistently good performance of the clamp member in all of its functions.

The clamp shaft is formed with a rectangular cross-section or flattened surfaces which mate with the walls defining the slot in the clamp member. Thus, with this relationship the clamp member is capable of rotating with the clamp shaft, to effect release of the leading end portion of the strap as hereafter described, enables the clamp member to accommodate itself to straps of different thicknesses, and permits rather liberal tolerances, due to manufacturing techniques and/or wear, to exist between parts of the strap clamping mechanism without any or significant sacrifice in the efficiency of the tool. For example, with a clamp member having a slot disposed at the preferred 15° angle to its strap gripping surface, relative movement between said clamp member and shaft of $\frac{1}{8}$ inch along the inclination of said slot provides for a 0.032 inch vertical travel of the clamp member.

The strap tension-applying means incorporated in the tool of the present invention is similar, in some respects, to that employed in conventional strap tensioning tools. Such tension-applying means includes a strap engaging capstan which is rotatably mounted on the tool body and an operating lever mounted on the capstan shaft for oscillation in opposite directions from a neutral position. A ratchet wheel is fixed to the capstan shaft and a spring urged drive pawl is mounted on the operating lever so as to engage with teeth of the ratchet wheel and drive such wheel only when the operating lever is moved in one direction from its neutral position to thereby tension the feed portion of a strap engaged with the capstan. A holding pawl is rotatably mounted on the clamp shaft and is spring-loaded so as to engage with the ratchet wheel to retain the same after rotation thereof by the drive pawl.

Distinguishing the tension-applying means of the tool of the present invention from those of known constructions is that the single operating lever which provides for rotation of the ratchet wheel to tension the feed portion of a strap engaged with the capstan, serves also to sequentially release the drive and holding pawls from the ratchet wheel, moves the clamp member away from the anvil to release the applied strap, and effects severence of the applied strap from its supply source.

More specifically, after the free end portion of a strap, which has been laced about and tensioned onto an article, is connected to an overlying feed portion of such strap, as by a metallic seal, that portion of the strap which extends from such seal to the capstan is still under tension, while the strap portion extending between the seal and clamp member is still in a relaxed condition. Release of the clamp member at this stage, is achieved generally with difficulty and usually with an unsightly, if not destructive, abrasion of one or more of the strap surfaces. Thus, with the tool of this invention, movement of the lever from its neutral position, in a direction opposite to the one direction for tensioning of the strap, provides for release of the ratchet wheel drive and holding pawls and, subsequently and as dictated by the release movement of the holding pawl, release of the clamp member.

More particularly, with the operating lever in its neutral position, after seal application to the overlying leading end and feed portions of strap, both the holding pawl and the drive pawl remain engaged with the capstan ratchet wheel under the loading of their respective springs. The drive pawl, however, is under a weaker spring loading than that applied to the holding pawl and, during movement of the operating lever from its neutral position in a direction opposite to that which provides for strap tensioning, engages with an edge cam surface on the holding pawl. Thus, during initial movement of the operating lever in such opposite direction, the drive pawl contacts the edge cam surface of the holding pawl and, as the spring load on the drive pawl is overcome, it is moved relative to the operating lever, away from the capstan ratchet wheel and against an abutment on such operating lever. At this stage, the capstan ratchet wheel is still retained in position by the holding pawl and the tensioned strap is still firmly gripped by the clamp member and anvil.

With the drive pawl now fixed against further movement relative to the operating lever, continued movement of the operating lever in such opposite direction causes the drive pawl to cam the holding pawl in a direction opposite to its spring loading to thereby disengage the same from the capstan ratchet wheel. Under the tension of the applied strap, the capstan rotates freely, causing the previously tensioned portion of the strap extending from the applied seal and the capstan to relax and is in a desired condition for severance, particularly in the case of molecularly oriented plastic strap.

Of particular significance is that the holding pawl is mounted on the clamp shaft through a lost-motion connection which permits the holding pawl to be disengaged from the capstan ratchet wheel before imparting rotation to the clamp shaft. Thus, at this stage, while the applied storage strap is still firmly gripped between the anvil and clamp member, the portions of the applied strap extending from opposite ends thereof are under substantially the same tension and, therefore, the subsequent release of the clamp member from the applied strap can be achieved with relative ease and with no abrading of the strap surfaces.

For simplicity, economy and ease of manufacture, the lost-motion connection between the holding pawl and clamp shaft preferably consists of an opening in the holding pawl that is defined by pairs of opposing walls, each of which is of convex contour and is adapted to engage with an adjacent flat surface of a squared portion of the clamp shaft which extends through such opening. With this construction, the convex walls defining the opening in the holding pawl simply rock relative to the flat surfaces of the squared portion of the clamp shaft as the holding pawl is initially rotated by the operating lever. As described, it is during this rocking movement that the holding pawl is disengaged from the capstan ratchet wheel so that all portions of the applied strap assume substantially the same tension and the strap portion extending between the applied seal and the capstan is relaxed.

With continued movement of the operating lever in a direction opposite to that which provides for strap tensioning, the holding pawl, having completed its rocking movement, imparts rotation to the clamp shaft which, in turn, releases the clamp member from the applied strap. During this continued movement of the operating lever, the now relaxed portion of strap extending between the applied seal and capstan is severed so that, in the case of molecularly oriented plastic strapping, no strap splitting or fibrillation is experienced.

As is apparent from the above description, the lost-motion connection between the holding pawl and the clamp shaft of the tool of this invention insures that the portions of the applied strap extending from opposite ends of the clamp member are under substantially the same tension before the clamp member is released and, also, that the strap portion extending between the applied seal and the capstan is relaxed before severance thereof is attempted. Thus, by varying the convexity of the walls defining the opening in the holding pawl, the degree of lost-motion can be accurately controlled, with a reduction in the radius of curvature of such convex walls providing for a greater rocking movement of the holding pawl before rotation is imparted to the clamp shaft.

As more fully described hereafter, the configuration of the clamp member and the extent to which the clamp shaft is rotated to release the clamp member from the applied strap are such as to provide a generous space between the opposing surfaces of such clamp member and anvil which facilitates removal of the tool from the applied strap, as well as easy lacing of the leading end portion of a strap which is to be applied to an article.

To further expedite strap lacing, one end of the capstan is provided with a slot for receiving the feed portion of a strap, with such slot being under-cut at a location inwardly from the end of the capstan so that the strap is retained within the capstan slot, notwithstanding its tendency to be displaced therefrom by its inherent flexibility.

Severance of the applied strap from the strap supply is achieved by cooperating shear members, including a fixed tubular member projecting from the tool body and slotted for passage of the feed portion of the strap therethrough and a blade mounted within the tubular member for rotation relative thereto. The rotatable blade includes a cam which projects into the path of and is moved into inoperative and operative positions by a bifurcated portion, formed on the operating lever, as such lever is moved in the respective opposite directions from its neutral position.

As described, the tool of this invention includes only a single lever which serves to move the clamp member away from the anvil to facilitate initial lacing of the free end portion of a strap therebetween, facilitates strap tensioning and, after the free end portion and an overlying feed portion are sealed together, provides for relaxation of the strap portion extending between the applied seal and capstan, release of the clamp member and severance of the applied strap. The clamp member itself is so constructed and mounted as to accommodate straps of different thicknesses, assures secure gripping of the free end portion of a strap during the initial tensioning thereof and uniform gripping throughout the tensioning stage and is released without abrading the applied strap. During such strap release as well as during strap lacing, the operating lever functions to move the clamp member away from the anvil so that tool removal from the applied strap and strap lacing are facilitated. Strap lacing is also expedited by the undercut strap-retaining slot in the capstan, making tool manipulation less dependent upon the skill of the operator and/or the disposition of the article surface, such as horizontal or vertical, against which the tool is seated during the strapping operation.

The tool of this invention is especially adapted for use with non-metallic strap which as employed herein includes strap comprised of rayon, polyester or other natural or synthetic textile cords, and straps made of thermoplastic materials, for example, molecularly oriented polypropylene, polyester and nylon. As is known in the art, relaxation of the tension in molecularly oriented plastic strap, and especially in polypropylene strap, is necessary prior to the severance thereof to avoid fibrillation, and it is apparent that the tool of the present invention is capable of satisfying this requirement.

While the clamp member and anvil are described and claimed as having "generally flat gripping surfaces", such terminology is intended to include surfaces which are formed with projecting teeth or are otherwise roughened to enhance their strap gripping effect.

For a detailed description of the present invention, reference is made to the accompanying drawing in which.

Figures 1, 10:
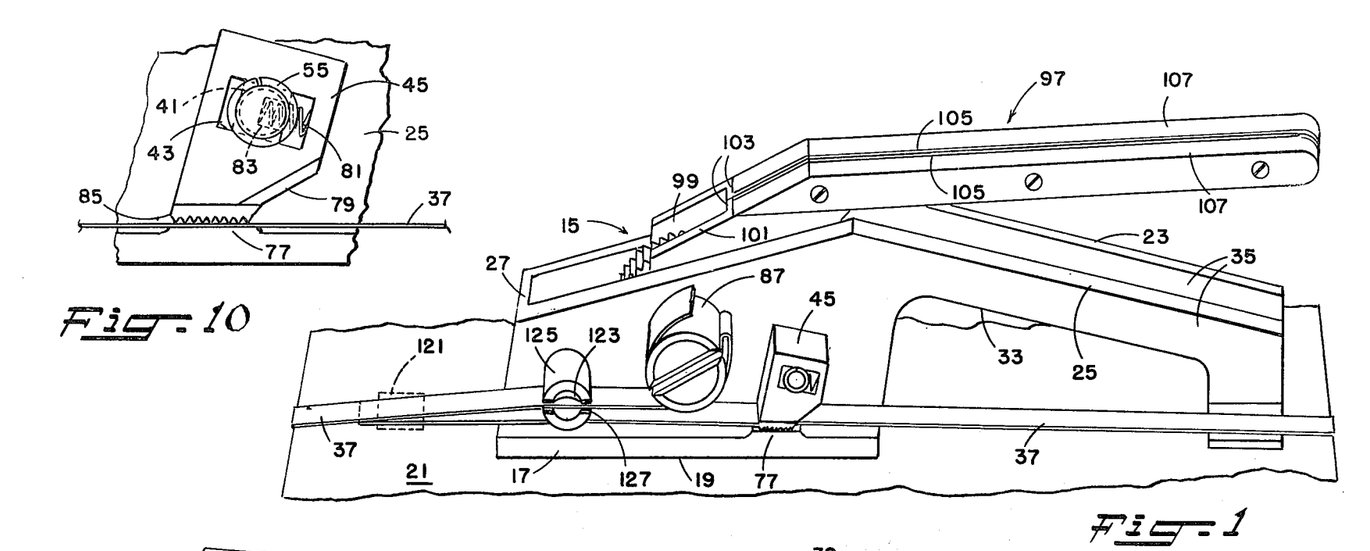
FIG. 1 is a perspective view of the strap tensioning tool of this invention.
FIGS. 6-11 illustrate, on an enlarged scale, portions of the tool shown in FIGS. 1-5.
Figure 2:
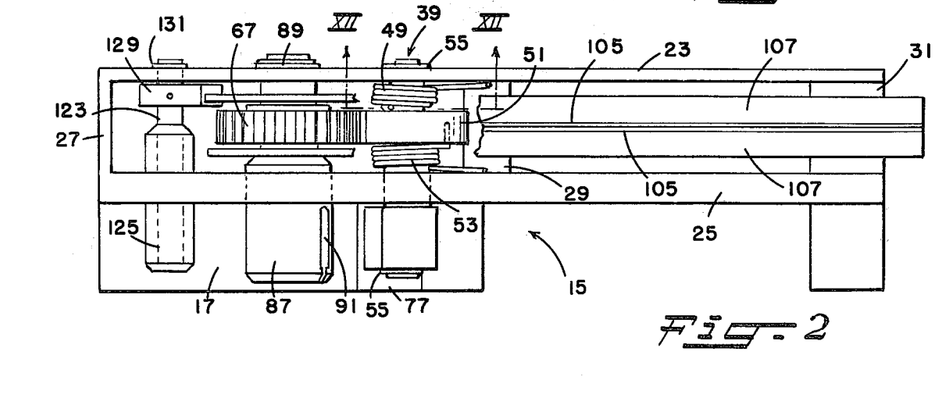
FIG. 2 is a plan view of the tool shown in FIG. 1 with a portion thereof broken away.

The elements of the tool 15 of this invention are formed of light weight metals where possible and as best shown in FIGS. 1 and 2 includes an aluminum main body comprised of base 17, having a flat surface 19 for engaging with an article, shown in part at 21, which is to be strapped, and a pair of side plates 23 and 25 which are integrally connected by walls 27, 29 and 31. Both of these side plates 23 and 25 are recessed at 33 so that the portions thereof indicated at 35 together define a handle which can be readily grasped by the operator. Desirably, the wall 31 projects beyond the side plate 25 in position to lie beneath the strap 37 which is to be applied, and thereby stabilize the tool against rotation during strap tensioning, as hereinafter described. As illustrated in FIG. 1, the portions 33 of the side plates 23 and 25 are inclined for comfort to the operator, particularly during strap tensioning.

Figure 12:
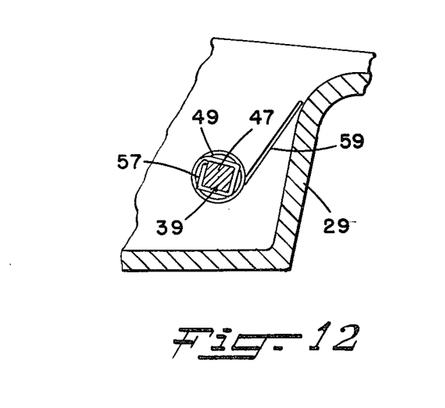
FIG. 12 is a vertical section taken along the line XII—XII of FIG. 2.

Supported for rotation by the side plates 23 and 25 is a clamp shaft 39, one end of which, as indicated at 41, is of generally square cross-section and is received within an inclined rectangular slot 43 of a clamp member 45. As shown in FIGS. 3-7 and 12, the portion 47 of the clamp shaft 39 that extends between the side plates 23 and 25 is also of square cross section and as shown in FIG. 2, has mounted thereon a clamp spring 49, a holding pawl 51 and a holding pawl spring 53. The clamp shaft 39 is fixed against axial movement by retaining rings 55 and, viewed in FIG. 12, is influenced in a counterclockwise direction by the spring 49, which has one end 57 wrapped about and locked onto the clamp shaft 39 and its other end 59 bearing against the wall 29 of the tool body.

Figures 4, 5, 6, 7, 8, 9:
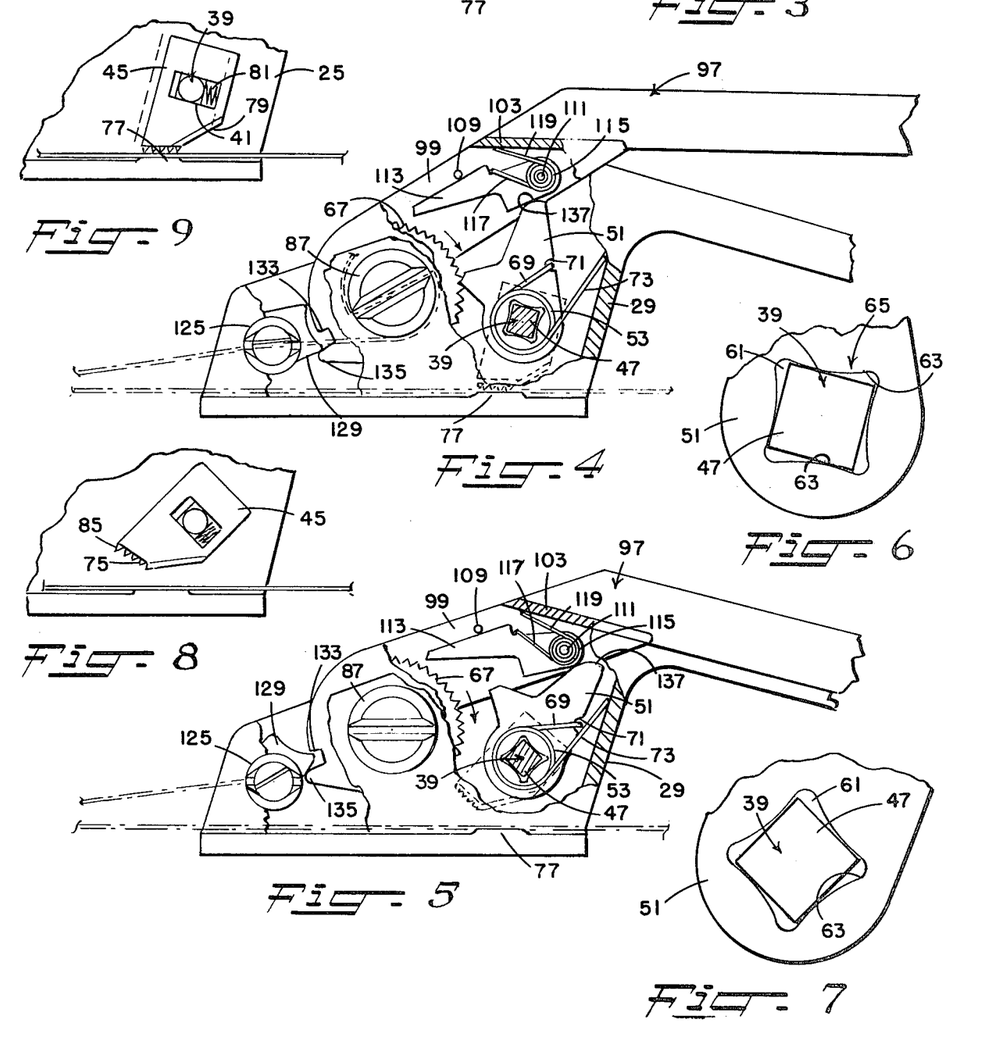

For reasons as will be more apparent hereafter, as shown in FIG. 6 the holding pawl 51 is mounted on the clamp shaft 39 by means of an opening 61 which is defined by like pairs of opposed, spaced walls 63 which are of like convex contour. This arrangement facilitates relative but limited rocking movement between the clamp shaft 39 and the holding pawl 51 and thus constitutes and is hereafter referred to as a lost-motion connection 65.

Figures 3, 11:
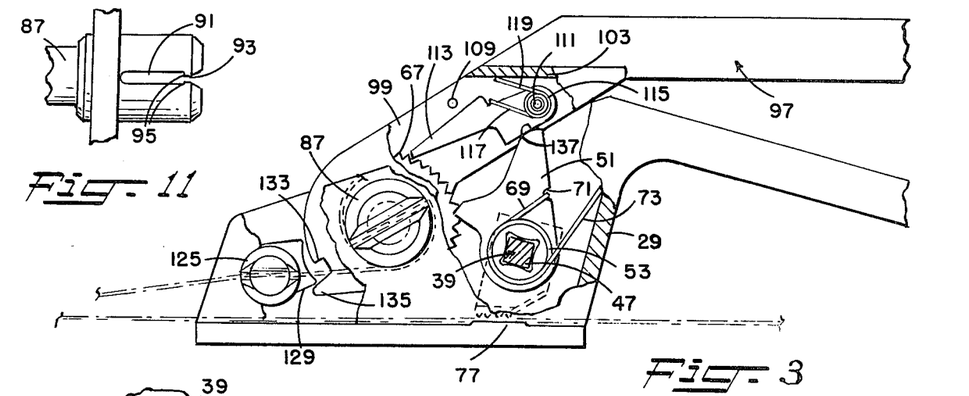
FIGS. 3, 4 and 5 are fragmentary side views of the tool shown in FIGS. 1 and 2 which illustrate the relationship of tool elements during various stages of operation.

As viewed in FIGS. 3-5, the holding pawl 51 is urged counterclockwise into engagement with a ratchet wheel 67 by the spring 53, having one end 69 seated within a notch 71 in the pawl 51 and its opposite end 73 bearing against the wall 29 of the tool body. The spring 53 is weaker than the spring 49 which acts upon the clamp shaft 39 so as to render the lost-motion connection 65 effective.

The clamp member 45 includes a roughened surface 75 which cooperates with an anvil 77, which constitutes part of the tool base 17, to firmly grip the leading end portion of the strap 37 which is positioned therebetween. Under the influence of the spring 49 on the clamp shaft 39, the clamp member 45 normally assumes a position as shown in FIGS. 1, 3, 9 and 10 and is moved into a position as seen in FIGS. 5 and 8 by rotation of the shaft 39, as hereafter described, in a direction opposite to the resilient force applied by such spring 49. The clamp member 45 is formed with a sharply bevelled surface 79 so that, when moved into the position shown in FIG. 8, the clamp member 45 is well spaced from the anvil 77 to facilitate insertion of the strap 37 therebetween and for easy removal of the tool after application of a tensioned strap to the article 21.

The inclined slot 43 in the clamp member 45 facilitates sliding movement of the clamp member 45 relative to the clamp shaft 39, and the square cross section of such shaft 39 assures that the clamp member 45 will move with such shaft 39 as it is rotated between positions as shown in FIGS. 8 and 9. The longitudinal axis of the slot 43 is inclined at an acute angle to the plane of the clamp member gripping surface 75, such angle being preferably, but not limited to, about 15°. For consistently satisfactory operation of the tool, a spring 81 is positioned within the slot 43 and, as best seen in FIG. 10, is retained in part within a recess 83 in the clamp shaft 39.

This spring 81 urges the clamp member 45 relative to the shaft 39 and toward the base 17. This arrangement is directly opposite that employed in tools known in the art and, while it permits the clamp member 45 to be manually moved into its broken line position shown in FIG. 9, as to facilitate strap insertion into the tool, its real importance is that it causes the heel portion 85 of the clamping member to effectively bite into the surface of the strap 37 during the initial tensioning thereof. The position and resulting action of the spring 83 thus overcomes a problem of longstanding since, with conventional tools, the absence or interrupted gripping of the strap 37 during its initial tensioning generally caused the leading end of the strap to be displaced from its desired position or from the tool itself, and often with damage to its surfaces. Play between the shaft 39 and the slot 43 in the clamp member 45 of the tool of this invention, as might arise by wear, generally involves no sacrifice in its gripping action of the clamp member 45.

The ratchet wheel 67 is fixed to a capstan 87 that is rotatably supported by the side plates 23 and 25 and fixed against axial movement in one direction by a retaining ring 89. The capstan 87 is slotted at 91 to receive a feed portion of the strap 37 and, as best shown in FIG. 11, the slot 91 is of reduced width at 93 to provide abatments 95 which inhibit the tendency for the strap 37 to be displaced from such slot 91 under its inherent flexibility.

With a strap 37 firmly gripped at its leading end by the clamp block 45 and anvil 77, then laced about the article 21, the feed portion thereof is inserted into the capstan slot 91, after which counterclockwise movement, as viewed in FIGS. 1 and 3, is imparted to the capstan 87 by means including an operating lever 97 to effect strap tensioning. During this movement of the capstan 87, the holding pawl 51 merely rides over the teeth of the ratchet wheel 67 but subsequently engages with the ratchet wheel teeth to prevent clockwise movement of the capstan 87 under the tension which has been applied to the strap 37.

The operating lever 97 includes arms 99 and 101 that are rotatably mounted on the capstan 87 and are integral with but offset by walls 103 from handle sections 105. Desirably, the portions of the lever 97 described are formed of metal to satisfy strength requirements, with the handle sections 105 being connected, as by tack welding, and substantially covered by grips 107 as of plastic material.

Extending between the lever arms 99 and 101 are pins 109 and 111, the latter of which serves as a pivot for a drive pawl 113 as shown in FIGS. 3-5. The free end of the pawl 113 is normally urged into engagement with the teeth of the ratchet wheel 67 by a spring 115 which encircles the pin 111 with one end 117 looped about the pawl 113 and its opposite end 119 bearing against the lever wall 103. Thus, upon movement of the operating lever 97 counterclockwise from its neutral position shown in FIG. 3, the pawl 113 drives the ratchet wheel 67, and the capstan 87 to which it is fixed, also in a counterclockwise direction to effect tensioning of the strap 37.

Repeated of such counterclockwise movements are generally necessary to tension the strap 37 to a desired degree and thus, during return of the lever 97 to its neutral position, the drive pawl 113 merely rides over the teeth of the ratchet wheel 67, while the holding pawl 51 is in full engagement with such teeth and retains the capstan 87 in its rotated position. After the desired tension has been applied to the strap 37 laced about the article 21, the leading end and overlying feed portions thereof are connected, as by a conventional metallic seal 121, as shown in FIG. 1. The tensioned strap applied to the article 21 may now be separated from the strap and the tool itself removed from such applied strap and, significantly, these operations are facilitated by the single operating lever 97.

More specifically, strap severance is achieved by a cutter assembly which includes a shear blade 123 rotatably supported within a shear sleeve 125 that is seated within an opening in the side plate 25. The sleeve 125 is slotted at 127 to receive a feed portion of the strap 37 along its path to the capstan 87, while the blade 123 is fixed against axial movement by a cam 129 fixed thereto and a retaining ring 131, and is rotated between positions shown in FIGS. 4 and 5 by cam drive lips 133 and 135 on the arm 99 of the operating lever 97.

Severance of the strap 37 is preferably achieved after the portion of the strap extending between the seal 121 and the capstan 87 has been relieved of tension and is controlled by the operating lever 97 during movement thereof in a clockwise direction from its neutral position shown in FIG. 3. Initially during this clockwise movement of the lever 97, the lowermost edge surface of the drive pawl 113 engages with a cam surface 137 formed along the edge of the holding pawl 51 and is rotated against the force applied by the spring 115 until it abuts against the pin 109, as shown in FIG. 4. In this manner, the pawl 113 is disengaged from the ratchet wheel 67 and, obviously, to achieve this effect the spring 115 is weaker than the spring 53 acting upon the holding pawl 51. As the holding pawl 51 undergoes no movement during this initial clockwise movement of the lever 97 from its neutral position shown in FIG. 3 to that of FIG. 4, the pawl 51 remains engaged with the ratchet wheel 67.

Continued clockwise movement of the lever 97 from its position shown in FIG. 4 brings the lost-motion connection 65 into play, with the holding pawl 51 being cammed and rocked clockwise relative to clamp shaft 39 by the lowermost edge surface of the drive pawl 113 to thereby disengage the same from the ratchet wheel 67. Thus, under the tension in the portion of the strap 37 extending between the seal 121 and the capstan 87, the capstan 87 rotates clockwise, as viewed in FIG. 5, until such strap portion is essentially relieved of tension. Concomitantly, the original free end portion of the applied strap which extends beyond the clamp member 45 and into the seal 121, also becomes taut from its original relaxed condition under the tension in the remainder of such applied strap. This result is evidenced by a slight movement of the entire tool toward the right, as viewed in FIG. 1-5, without any apparent sliding movement of the clamp member relative to the strap as might abrade the surface thereof.

With the portions of the applied strap extending from opposite ends of the clamp member 45 now under like tension, release of claim member 45 from the strap can be achieved easily and with no abrasion of the strap surface. Such release of the clamp member 45 is effected simultaneously with and preferably subsequent to severance of the applied tensioned strap from the strap supply during a still further clockwise movement of the lever 97 from its position shown in FIG. 4 to that of FIG. 5. More specifically, during such movement of the lever 97, the lip 135 on the lever arm 99 urges the cutter cam 129 in a counterclockwise direction, as viewed in FIG. 4, to rotate the blade 123 likewise relative to the sleeve 125 and thereby sever the now relaxed portion of the strap which is within the slot 127 of such sleeve 125.

Also during the movement of the lever 97 toward its position shown in FIG. 5, the holding pawl 51, having completed its rocking movement relative to the clamp shaft 39, now causes the shaft 39 to rotate into a position as shown in FIG. 7, with the clamp member 45 being carried away from the anvil 77 as seen in FIG. 8.

After removal of the tool 15 from the applied strap, the lever 97 is merely released and, under the resilient action of the springs 49, 53 and 115, returns to its neutral position shown in FIG. 3. During this return of the lever 97, the lip 133 on the lever arm 99 drives the cutter cam 129, and the blade 123 to which such cam is fixed, into their original positions, as seen in FIG. 1.

The degree of lost-motion between the holding pawl 51 and clamp shaft 39 is dependent upon the radius of the convex walls 63 defining the opening 61, with the smaller such radius the greater the lost-motion between the pawl 51 and the shaft 39. This lost-motion need be only such as to disengage the holding pawl 51 from the ratchet wheel 67, in which case the subsequent strap severance and release of the clamp member 45 will occur concomitantly. Preferably, the lost-motion is such that the holding pawl 51 imparts rotation to the clamp shaft 39 after the strap has been severed. From this disclosure it will be apparent that the opening 61 in the holding pawl may be defined by straight or planar wall which forms a square opening, with the clamp shaft 39 being formed with walls of convex contour so as to facilitate rocking movement of the holding pawl 51 relative thereto.

While the tool 15, as described, is particularly suited for use with molecularly oriented plastic strap, it will be apparent that the cutter cam 129 and/or the lips 133 and 135 on the arm 99 of the lever 97 may be oriented so as to effect strap severance before the holding pawl 51 is disengaged from the ratchet wheel 67; that is, while the strap portion extending from the seal 121 to capstan 87 remains in a tensioned condition.

I claim:

1. A tool for use in applying a tensioned strap about an article and having a free end portion and a feed portion, said tool including a body having an anvil, a clamp member having a shaft mounted on said body for rotation relative thereto, means for rotating said clamp shaft to move said clamp member toward said anvil, said anvil and clamp member having opposed, generally flat gripping surfaces for together clamping a strap inwardly from the free end thereof, means for applying tension to the feed portion of the strap, means mounting said clamp member for sliding movement on said clamp shaft along a plane which defines with the plane of the gripping surface thereon an acute angle having its apex remote from said tension applying means whereby said clamp member is slidable in one direction relative to said clamp shaft to accommodate the thickness of the strap gripped between said clamp member and said anvil and in the opposite direction during strap tensioning to firmly clamp such strap against said anvil by wedging action against said clamp shaft, and resilient means urging said clamp member relative to said clamp shaft in a direction away from said tension applying means whereby said clamp member effectively grips the free end portion of the strap as tension is applied to the feed portion of the strap.

2. A tool as defined in claim 1 wherein said means mounting said clamp member on said clamp shaft includes walls defining an elongated slot in said clamp member within which is received a portion of said clamp shaft, said elongated slot having its logitudinal axis disposed at an acute angle relative to the plane of said gripping surface, and flat surfaces on said clamp shaft portion mating with walls of said slot, whereby said clamp member is capable of sliding relative to yet move with said clamp shaft during the rotation thereof.

3. A tool as defined in claim 1 wherein said tension applying means includes a capstan mounted on said body for rotation relative thereto and in position to engage with the feed portion of a strap, a ratchet wheel fixed to said capstan, an operating lever mounted for oscillation relative to said capstan in opposite directions from a neutral position, drive means including a drive pawl mounted on said lever for rotating said ratchet wheel when said lever is moved in one direction from its neutral position to thereby tension the feed portion of a strap engaged with said capstan, holding means including a holding pawl for engaging with said ratchet wheel to retain the same in position after the rotation thereof by said drive pawl, and release means operative during movement of said lever from its neutral position in a direction opposite to said one direction for moving said drive and holding pawls to disengage the same from said ratchet wheel and for subsequently effecting rotation of said clamp shaft to move said clamp member away from said anvil whereby, after the free end and tensioned feed portions of a strap applied about an article have been connected together, movement of said lever in said opposite direction provides for relaxation of the strap feed portion extending from the strap connection and said capstan and tensioning of the strap portion extending between the strap connection and said clamp member prior to movement of said clamp member away from said anvil.

4. A tool as defined in claim 3 further including means operated by said lever during the movement thereof in said opposite direction for cutting the feed portion of the strap at a location between the connection of the free end and feed portions thereof and said capstan.

5. A tool as defined in claim 4 wherein said cutting means is operated by said lever after said drive and holding pawls are disengaged from said ratchet wheel, whereby the feed portion being severed is in a relaxed condition.

6. A tool as defined in claim 3 wherein said release means includes a lost-motion connection between said holding pawl and said clamp shaft for effecting rotation of said clamp shaft by movement of said holding pawl after the disengagement thereof from said ratchet wheel.

7. A tool as defined in claim 6 wherein said lost-motion connection includes walls defining an opening in said holding pawl through which said clamp shaft extends with said walls engaging with walls on said clamp shaft, the walls of one of said holding pawl and said clamp shaft being planar and the wall of the other of said holding pawl and clamp shaft being convex whereby said holding pawl is adapted to rock to a limited degree relative to said clamp shaft before rotating the same.

8. A tool as defined in claim 6 wherein said drive and said holding means each include a spring for urging said respective drive and holding pawls into engagement with said ratchet wheel, and wherein said release means further includes cam surfaces on said drive and holding pawls which together cooperate during movement of said lever in said opposite direction to move said drive and holding pawls in a direction as to overcome the force of said springs and disengage said pawls from said ratchet wheel.

9. A tool as defined in claim 8 wherein said release means further includes an abutment on said lever in position to be engaged by said drive pawl after disengagement thereof from said ratchet wheel, and wherein said spring of said drive means is weaker than said spring of said holding means whereby said drive pawl is disengaged from said ratchet wheel and engaged with said abutment prior to movement of said holding pawl by said cooperating cam surfaces.

10. A tool for use in applying a tensioned strap about an article and having a free end portion and a feed portion, said tool including a body having an anvil, clamping means including a clamp member adapted to cooperate with said anvil for gripping a strap inwardly from the free end thereof, means for applying tension to the feed portion of a strap including a capstan mounted on said body for rotation relative thereto and in position to engage with the feed portion of a strap, a lever mounted for oscillation relative to said capstan in opposite directions from a neutral position, a ratchet wheel fixed to said capstan, drive means including a drive pawl mounted on said lever for rotating said ratchet wheel when said lever is moved in one direction from its neutral position to thereby tension the feed portion of the strap engaged with said capstan, holding means including a holding pawl for engaging with said ratchet wheel to retain the same in position after the rotation thereof by said drive pawl, and release means operative during movement of said lever from its neutral position in a direction opposite to said one direction for moving said drive and holding pawls to disengage the same from said ratchet wheel and for subsequently moving said clamp member away from said anvil whereby, after the free end and tensioned feed portions of a strap applied about an article have been connected together, movement of said lever in said opposite direction provides for relaxation of the strap feed portion extending from the strap connection and said capstan and tensioning of the strap portion extending between the strap connection and said clamp member prior to movement of said clamp member away from said anvil.

11. A tool as defined in claim 10 further including means operated by said lever during the movement thereof in said opposite direction for cutting the feed portion of the strap at a location between the connection of the free end and feed portions thereof and said capstan.

12. A tool as defined in claim 10 wherein said clamping means includes a clamp shaft mounted on said body for rotation relative thereto and on which said clamp member is supported and means for rotating said clamp shaft to move said clamp member toward said anvil, and wherein said release means includes a lost-motion connection between said holding pawl and said clamp shaft for effecting rotation of said clamp shaft by movement of said holding pawl after the disengagement thereof from said ratchet wheel.

13. A tool as defined in claim 12 wherein said lost-motion connection includes walls defining an opening in said holding pawl through which said clamp shaft extends with said walls engaging with walls on said clamp shaft, the walls of one of said holding pawl and said clamp shaft being planar and the wall of the other of said holding pawl and clamp shaft being convex whereby said holding pawl is adapted to rock to a limited degree relative to said clamp shaft before rotating the same.

14. A tool as defined in claim 12 wherein said drive and said holding means each include a spring for urging said respective drive and holding pawls into engagement with said ratchet wheel, and wherein said release means further includes cam surfaces on said drive and holding pawls which together cooperate during movement of said lever in said opposite direction to the force of said springs and disengage said pawls from said ratchet wheel.

15. A tool as defined in claim 14 wherein said release means further includes an abutment on said lever in position to be engaged by said drive pawl after disengagement thereof from said ratchet wheel, and wherein said spring of said drive means is weaker than said spring of said holding means whereby said drive pawl is disengaged from said ratchet wheel and engaged with said abutment prior to movement of said holding pawl by said cooperating cam surfaces.

16. A tool as defined in claim 12 wherein said clamp member and said anvil include opposed, generally flat gripping surfaces, and wherein said clamp member is mounted for sliding movement on said clamp shaft along a plane which defines with the plane of the gripping surface thereon an acute angle having its apex remote from said tension applying means whereby said clamp member is slidable in one direction relative to said clamp shaft to accommodate the thickness of the strap gripped between said clamp member and said anvil and in the opposite direction during strap tensioning to firmly clamp such strap against said anvil by wedging action against said clamp shaft, and resilient means urging said clamp member relative to said clamp shaft in a direction away from said tension applying means whereby said clamp member effectively grips the free end portion of the strap as tension is applied to the feed portion of the strap.

17. A tool as defined in claim 10 wherein said capstan includes a slot that extends diametrically of and is open at one end of said capstan to facilitate insertion of a feed portion of strap into said slot, said slot being of reduced width at a location adjacent to the open end thereof to provide abutments which inhibit displacement of strap laterally from the remainder of said slot and toward the open end thereof.

* * * * *

UNITED STATES PATENT AND TRADEMARK OFFICE
CERTIFICATE OF CORRECTION

PATENT NO. : 4,252,158
DATED : February 24, 1981
INVENTOR(S) : Robert L. McDade

It is certified that error appears in the above-identified patent and that said Letters Patent are hereby corrected as shown below: Please amend Claim 14 as follows:

-- Claim 14 (Amended): A tool is defined in Claim 12 wherein said drive and said holding means each include a spring for urging said respective drive and holding pawls into engagement with said ratchet wheel, and wherein said release means further includes cam surfaces on said drive and holding pawls which together cooperate during movement of said lever in said opposite direction to <u>move said drive and holding pawls in a direction as to overcome</u> the force of said springs and disengage said pawls from said ratchet wheel. --

Signed and Sealed this

Twenty-sixth Day of May 1981

[SEAL]

Attest:

RENE D. TEGTMEYER

Attesting Officer  Acting Commissioner of Patents and Trademarks